(12) United States Patent
Habeck

(10) Patent No.: US 6,183,393 B1
(45) Date of Patent: Feb. 6, 2001

(54) METHOD FOR REDUCING JERKING DURING GEAR SHIFTING

(75) Inventor: Dirk Habeck, Tettnang (DE)

(73) Assignee: ZF Friedrichshafen AG, Friedrichshafen (DE)

( * ) Notice: Under 35 U.S.C. 154(b), the term of this patent shall be extended for 0 days.

(21) Appl. No.: 09/403,132
(22) PCT Filed: Jun. 12, 1998
(86) PCT No.: PCT/EP98/03551
   § 371 Date: Oct. 14, 1999
   § 102(e) Date: Oct. 14, 1999
(87) PCT Pub. No.: WO98/58196
   PCT Pub. Date: Dec. 23, 1998

(30) Foreign Application Priority Data

Jun. 17, 1997 (DE) .............................................. 197 25 513

(51) Int. Cl.⁷ .............................................. F16H 61/06
(52) U.S. Cl. .............................................. 477/117; 477/162
(58) Field of Search .............................................. 477/116, 117, 477/155, 162

(56) References Cited

U.S. PATENT DOCUMENTS

| | | | |
|---|---|---|---|
| 5,005,444 | * 4/1991 | Kimura et al. | 477/117 |
| 5,046,178 | * 9/1991 | Hibner et al. | 477/117 |
| 5,537,887 | * 7/1996 | Jang et al. | 477/155 X |
| 5,558,597 | 9/1996 | Oba et al. | 477/98 |
| 5,609,068 | 3/1997 | Gruhle et al. | 74/336 R |
| 5,733,220 | * 3/1998 | Iizuka | 477/116 |
| 5,741,201 | * 4/1998 | Tsutsui et al. | 477/116 |
| 5,807,207 | * 9/1998 | Hisano et al. | 477/116 |
| 5,842,950 | * 12/1998 | Tsutsui et al. | 477/116 X |

FOREIGN PATENT DOCUMENTS

| | | |
|---|---|---|
| 44 24 456 A1 | 1/1996 | (DE) . |
| 197 22 954 C1 | 6/1998 | (DE) . |
| 0 783 079 A1 | 7/1997 | (EP) . |

OTHER PUBLICATIONS

ZF Getriebe GmbH Saarbrücken, "Funktionsbeschreibung Automatikgetriebe, 5 HP 19 FL", Aug. 1995, pp. 23–29.

* cited by examiner

Primary Examiner—Charles A Marmor
Assistant Examiner—Ha Ho
(74) Attorney, Agent, or Firm—Davis and Bujold

(57) ABSTRACT

The invention relates to a method to reduce jerking during shifting in an automatic gear box. The automatic gear box has a selection lever (22) with a forward drive (D) and reverse (R) operating positions, in addition to a parking position (P) and a neutral position (N). A first coupling is closed in positions R, N and D (first gear). By moving from position D and shifting to N, a second coupling is opened or by moving from position R and shifting to N, a third coupling is opened. The inventive method provides that the pressure level of the first coupling (K1) is reduced from a first (p1) pressure level to a second pressure level when a gear shifting condition is met. The first coupling (K1) is opened for a specific amount of time when a D/N or R/N shift in the selection lever is recognized.

4 Claims, 3 Drawing Sheets

| CLUTCH - LOGIC | | | | | | | | |
|---|---|---|---|---|---|---|---|---|
| POS/GEAR | Clutch | | | | | | | Free Wheel |
| | A | B | C | D | E | F | G | 1. G. |
| R = R-Gear |   | * |   | * |   |   | * |   |
| N = Neutral |   |   |   |   |   |   | * |   |
| D,1. Gear | * |   |   |   |   |   | * | * |
| D,2. Gear | * |   | * |   |   |   | * |   |
| D,3. Gear | * |   | * |   |   | * |   |   |
| D,4. Gear | * |   |   |   | * | * |   |   |
| D,5. Gear |   |   | * |   | * | * |   |   |
| 1,1. Gear | * |   |   | * |   |   | * | * |

\* = active

Fig. 2

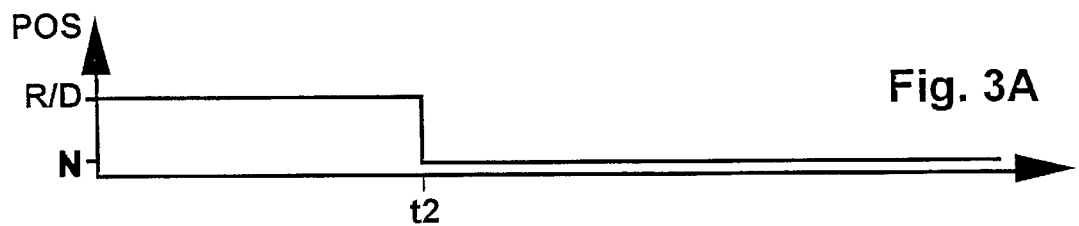
Fig. 3A
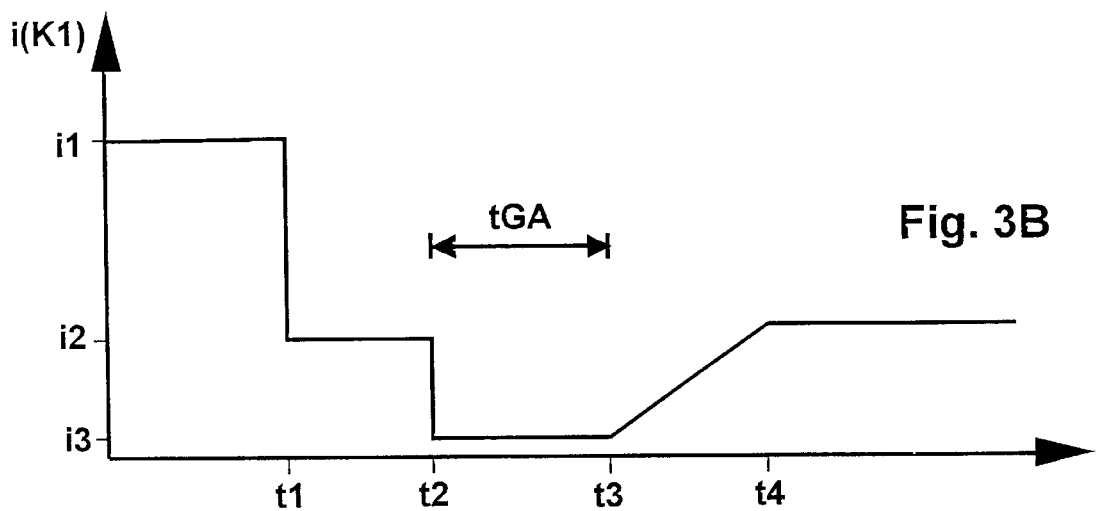
Fig. 3B
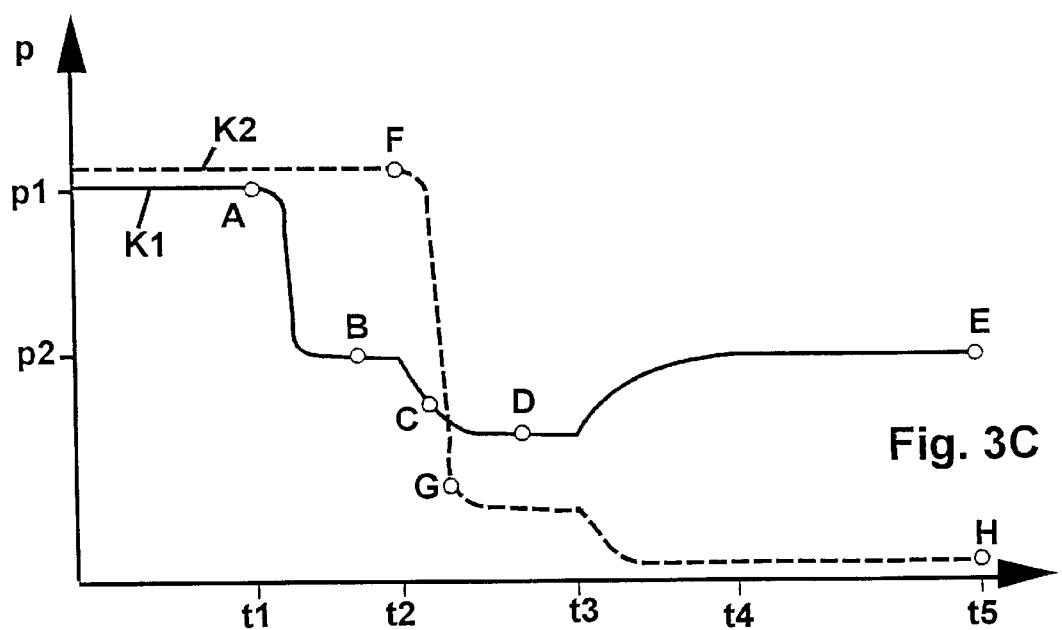
Fig. 3C
Fig. 3

METHOD FOR REDUCING JERKING DURING GEAR SHIFTING

BACKGROUND OF THE INVENTION

The invention relates to a method for reducing jerking during gear shifting of an automatic transmission driven by an internal combustion engine.

As disclosed in "Funktionsbeschreibung Automatikgetriebe, 5 HP 19 FL" of ZF Getriebe GmbH Saarbrucken, issued in August 1995, an automatic transmission with a selector lever having a forward drive (D) and reverse drive (R) positions, and parking (P) and neutral (N) positions. In the R, N and D positions (first gear) a first clutch is closed. By moving from position D to N a second clutch is opened and by moving from the position R to N a third clutch is opened. In an automatic transmission of this kind a problem can arise in the practice: when gear shifting, that is, in the transition from the position D to N or from R to N, respectively the second or third clutch is opened. The shifting quality when changing gears is determined by the manner in which it is possible to smoothly carry out the torque reduction. Decisive for this are, on one hand, design of the vehicle and, on the other, the duration of pressure reduction of the clutch being disengaged. However, the requirement of a good shifting quality is opposed to the requirement of adequate safety and durability criteria. These determine that under all conditions, such as low temperatures, the clutch to be disengaged must be drained with certainty. If this is not ensured, then when the clutch opens and the accelerator pedal is simultaneously actuated, there can result a destruction of the clutch. Since the safety and durability criteria must be ranked above the comfort demands, jolts occurring when gear shifting have hitherto been accepted.

The problem on which the invention is based is now to provide for the above described automatic transmission that both requirements, namely, comfort and safety, be satisfied.

SUMMARY OF THE INVENTION

According to the invention, the solution consists in that upon detection of a gear shift condition the pressure level of the first clutch be reduced from a first to a second pressure level, the second pressure level being above the slip limit so that the first clutch remains closed.

In a development of this, it is proposed that upon detection of the position N and opening of the second or third clutch, the first clutch be opened for a presettable time. After lapse of the time step, the pressure level of the first clutch is again raised, via a ramp function, to the second pressure level so that the clutch is again closed.

A first advantage of the solution, according to the invention and the development thereof, consists in that as result of the flat pressure gradient of the first clutch to be disengaged, the transmission input torque is smoothly reduced before the second or third clutch is regularly disengaged, coming from a high pressure level and becomes drained. A second advantage consists in that said function can only be implemented by a software change. Changes in the hydraulic system of the transmission hardware are thus unnecessary.

In a development of the invention, it is proposed that the gear shift condition be detected when: the temperature of the hydraulic fluid is higher than a limit value and the transmission output rotational speed and a performance wish and motor rotational speed presettable by the driver are each below a limit value. This development offers the advantage that the different chassis conditions are adequately taken into account.

BRIEF DESCRIPTION OF THE DRAWING(S)

A preferred embodiment is shown in the figures. In the figures:

FIG. 2 is a table of the clutch logic; and

FIG. 3 is a time diagram.

DESCRIPTION OF THE PREFERRED EMBODIMENT(S)

Figure 1:
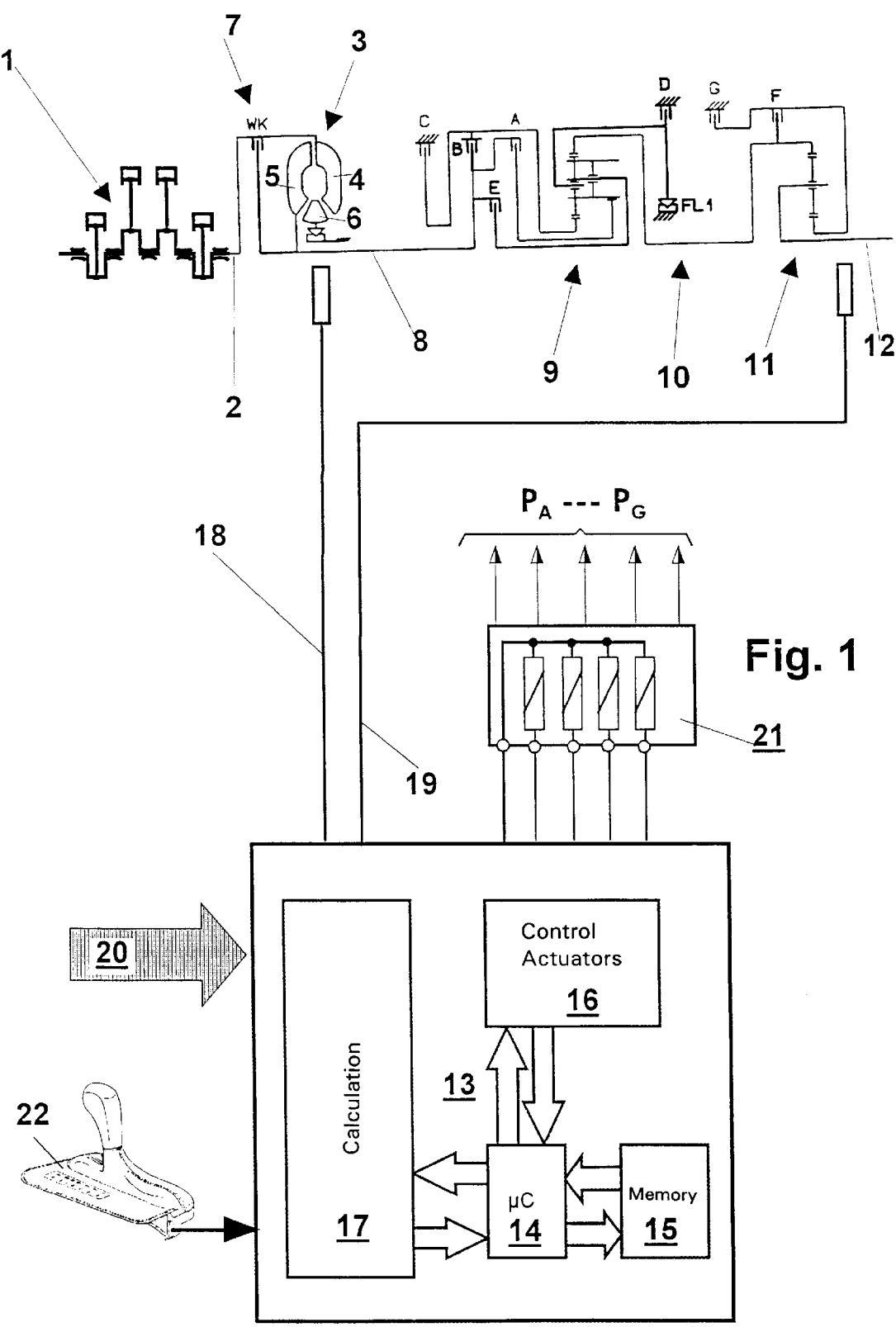
FIGS. 1 is a system diagram.

FIG. 1 shows a system diagram of an automatic transmission. It consists of the intrinsically mechanical part, a hydrodynamic converter 3, a hydraulic control unit 21 and an electronic transmission control 13. The automatic transmission is driven by a prime mover 1, preferably an internal combustion engine, via an input shaft 2. This is non-rotatably connected with the impeller 4 of the hydrodynamic converter 3. The hydrodynamic converter 3 is known to consist of an impeller 4, a turbine wheel 5 and a stator 6. Parallel to the hydrodynamic converter 3 is situated a converter clutch 7. The converter clutch 7 and the turbine wheel 5 lead to a turbine shaft 8. When the converter clutch 7 is actuated, the turbine shaft 8 has the same rotational speed as the input shaft 2. The mechanical part of the automatic transmission consists of clutches and brakes A to G, a free wheel 10 (FL1), a Ravigneaux set 9 and a rear-mounted planetary gear set 11. The output is effected via a transmission output shaft 12. The latter leads to a differential, not shown, which drives, via two axle half shafts, the output drive of a vehicle, not shown. A gear is adjusted by a clutch/brake combination. The coordination of the clutch logic with the gear can be seen in FIG. 2. The clutch G, shown as multi-disc clutch in FIG. 1, is accordingly closed in the positions R, N and D (first gear). This clutch is hereinafter designated as the first clutch. In the position D (first gear), the clutch A is closed. This is hereinafter designated as the second clutch. In the position R, e.g. the clutch D, also designed as multi-disc brake, is closed. This hereinafter designated as the third clutch. Since the mechanical part is not relevant for a better understanding of the invention, a detailed description is omitted.

The electronic transmission control 13 selects an adequate gear in accordance with input variables 18 to 20 and 22. The electronic transmission control 13, via the hydraulic control unit 21 where electromagnetic actuators are located, activates an adequate clutch/brake combination. During the shifting transitions, the electronic transmission control 13 determines the pressure curve of the clutches/brakes involved in the gear shift. Of the electronic transmission control 13, there are shown as blocks in extensively simplified manner: micro-controller 14, memory 15, function block control actuators 16 and function block calculation 17. In the memory 15 are deposited the data that are relevant to the transmission. Data relevant to the transmission are, e.g. programs and specific characteristic value of the vehicle, the same as diagnosis data. The memory 15 is usually designed as EPROM, EEPROM, or buffered RAM. In the function block calculation 17 are calculated the data relevant to a gear shift curve. The function block control actuators 16 serves to control the actuators located in the hydraulic control unit 21. The electronic transmission control 13 receives input variables 20. Input variables 20 are, e.g. a variable representative of the driver's desired performance like the accelerator pedal/throttle valve position, the signal of the torque generated by the internal combustion engine, the rotational speed and temperature of the internal combustion engine, etc. The specific data of the internal combustion engine are usually prepared by a motor control unit. This is not shown in FIG. 1. As additional input variables, the electronic transmission control 13 receives the rotational speed of the turbine wheel 18, i.e. of the transmission input rotational speed and of the transmission output shaft 19, the same as signals of a selector lever 22.

In FIG. 3 a time diagram for a method is shown, according to the invention. FIG. 3 consists of the parts FIG. 3A to 3C. Each one shows here in the course of time: FIG. 3A the position of the selector lever 22 (POS), FIG. 3B the current value for the electromagnetic pressure regulator i (K1) issued by the electronic transmission control 13 and FIG. 3C the pressure curve of the first clutch K1 and of the second clutch K2. The pressure curve of the first clutch K1 is here designed as solid line. The pressure curve of the second clutch K2 is designed as dotted line. At moment t1, a gear shift condition is detected. The gear shift condition exists when:

the temperature of the hydraulic fluid (theta) is higher than a limit value GW (theta>GW) and the transmission output rotational speed nAB is lower than a limit value GW (nAB<GW) and a desired performance DKI presettable by the driver is below a limit value GW (DKI<GW) and the motor rotational speed nMOT is lower than a limit value GW (nMOT<GW).

As shown in FIG. 3B, with the detection of the gear shift condition, the current value of the first clutch K1 is reduced from a first current value i1 to a second current value i2. Hereby the pressure curve of the first clutch K1 changes in point A from the first pressure level p1 in direction to the second pressure level p2. During the time interval t1 to t2, the first clutch K1 reaches the second pressure level p2 in point B. The second pressure level is here selected so that the clutch is still closed. This second pressure level p2 constitutes a function of the torque MM generated by the internal combustion engine and the rotational speed nMOT thereof. It thus applies: p2(K1)=f (MM, nMOT). At moment t2, the electronic transmission control 13 detects the shift of the selector lever from the position D to N or R to N. The electronic transmission control 13 thus will, at moment t2, lead the current value of the first clutch K1 from the second current value i2 to the third current value i3. On the other hand, the electronic transmission control 13 will issue the disengagement command for the second clutch K2. In point C, the first clutch K1 then opens. For the second clutch K2, the disengagement phase begins in point F, it becomes completely open in point G. Likewise at moment t2 begins a time step designated in FIG. 3B with tGA. This time step determines the t3 moment. During this time step, the pressure of the first clutch K1 is lowered to the extent that the clutch, under consideration of all tolerance positions, certainly slips but does not drain. The pressure level here corresponds to that of the point D. With the lapse of the time step tGA at moment t3 the second clutch K2 becomes completely drained, pressure level=0 bar. For the first clutch K1, a ramp function begins during the time interval t3 to t4, in FIG. 3B the current value hereby changes from i3 to i2. As consequence of this, the first clutch K1 will again close. During the time interval t4 to t5, the first clutch remains on the second pressure level p2. At moment t5, the method terminates. For the first clutch in the final point E and for the second clutch in the final point H.

The method, according to the invention, can be summarized as follows: With detection of the gear shift condition, the pressure level in the first clutch K1 is lowered to the extent that it can still transmit without slipping the torque generated by the internal combustion engine. With gear shift and detection of the position N, the pressure level of the first clutch is lowered to the extent that the disc set continuously starts to slip with regard to all tolerance positions corresponding to point C in FIG. 3C. This gradient, corresponding to the pressure difference point B to point C, is here selected so that the first clutch K1 smoothly reduces the transmission output torque before the clutch K2 to be regularly disengaged, coming from a high pressure level, corresponding to point F in FIG. 3C, becomes drained. The method can be implemented in an existing automatic transmission by simple change of software. Changes in the hydraulic system of the transmission hardware are thus unnecessary.

Reference Numerals 1 prime mover
2 input shaft
3 hydrodynamic converter
4 impeller
5 turbine wheel
6 stator
7 converter clutch
8 turbine shaft
9 ravigneaux set
10 free wheel fL1
11 planetary gear set
12 transmission output shaft
13 electronic transmission control
14 micro-controller
15 memory
16 function block control actuators
17 function block calculation
18 transmission input rotational speed signal
19 transmission output rotational speed signal
20 input variables
21 hydraulic control unit
22 selector lever

What is claimed is:

1. A method for reducing jerking during shifting in an automatic transmission driven by an internal combustion engine (1) with a selector lever (22) operable by a driver and having at least one forward drive (D) and one reverse drive (R) operating position, and one parking (P) and one neutral (N) position, the method comprising the steps of:

closing a first clutch (K1) in the positions R, N and D (first gear);

opening a second clutch (K2) when moving from the position D and shifting to N;

opening a third clutch (K3) when moving from the position R and shifting to N; and wherein upon detection of a gear shift condition, reducing the pressure level of the first clutch (K1) from a first (p1(K1)) to a second (p2(K1)) pressure level, the second pressure level (p2(K1)) being above a slip limit so that the first clutch remains closed.

2. The method according to claim 1, further comprising the step of obtaining the second pressure level (p2(K1)) as a function of the torque (MM) generated by the internal combustion engine and a rotational speed (nMOT) thereof (p2(K1)=f (MM, nMOT).

3. The method according to claim 1, further comprising the step of upon detection of the position N and the opening of the second or third clutch, the first clutch (K1) is opened for a presettable time (tGA) and after lapse of the time step (tGA=0) the pressure level of the first clutch (K1) is again raised via a ramp function to the second pressure level (p2(K1)) so that the first clutch again closes.

4. The method according to claim 3, further comprising the step of detecting the gear shift condition when:

a hydraulic fluid temperature (theta) is higher than a first limit value ($GW_1$) (theta>$GW_1$) and a transmission output rotational speed (nAB) is lower than a second limit value ($GW_2$) (nAB<$GW_2$) and a desired performance (DKI) presettable by the driver is below a third limit value ($GW_3$) (DKI<$GW_3$) and a motor rotational speed (nMOT) is lower than a fourth limit value ($GW_4$) (nMOT<$GW_4$).

\* \* \* \* \*